United States Patent [19]

Venturini

[11] Patent Number: 5,662,002
[45] Date of Patent: Sep. 2, 1997

[54] MANUAL CONTROL DEVICE FOR CONTROLLING ACCELERATION, BRAKING, AND THE LIKE

[75] Inventor: Giancarlo Venturini, Rome, Italy

[73] Assignee: Guidosimplex S.N.C. Di Giancarlo Venturini & C., Rome, Italy

[21] Appl. No.: 441,691

[22] Filed: May 15, 1995

[30] Foreign Application Priority Data

May 13, 1994 [IT] Italy ................................ RM94A0297

[51] Int. Cl.$^6$ .................................................. G05G 11/00
[52] U.S. Cl. .................................... 74/484 R; 74/486
[58] Field of Search ........................... 74/484 R, 479.01, 74/486; 200/61.57, 61.54; 338/47, 50

[56] References Cited

U.S. PATENT DOCUMENTS

| | | | |
|---|---|---|---|
| 1,512,072 | 10/1924 | Williamson | 74/486 |
| 1,593,876 | 7/1926 | Learmont | 74/486 |
| 1,601,632 | 9/1926 | Loehr | 74/486 |
| 2,200,625 | 5/1940 | Koppel . | |
| 4,078,628 | 3/1978 | Reichenberger | 74/486 |
| 5,121,889 | 6/1992 | Carey, Jr. | 244/234 |

FOREIGN PATENT DOCUMENTS

| | | | |
|---|---|---|---|
| 2333546 | 1/1975 | Germany . | |
| 7737724 | 4/1978 | Germany . | |
| 986016 | 3/1951 | Italy | 74/486 |
| 263060 | 12/1926 | United Kingdom . | |
| WO9206860 | 4/1992 | WIPO . | |

Primary Examiner—Charles A. Marmor
Assistant Examiner—David M. Fenstermacher
Attorney, Agent, or Firm—Beveridge, DeGrandi, Weilacher & Young, LLP

[57] ABSTRACT

A manual control device for transmitting manual control signals of an operator including a plurality of interconnected lever elements, an elastically deformable bearing element, and a potentiometer element to facilitate manual control of a vehicle by persons with disabilities where each lever is swingably mounted on the elastically deformable element so that swinging one lever element from a rest position to a control transmission position swings the adjacent lever elements and causes deformation of the elastically deformable bearing element which in turn acts on the potentiometer before returning to the rest position.

15 Claims, 4 Drawing Sheets

MANUAL CONTROL DEVICE FOR CONTROLLING ACCELERATION, BRAKING, AND THE LIKE

FIELD OF THE INVENTION

The present invention concerns a device for manually control acceleration, braking and like.

More specifically, the invention concerns a device of the above-mentioned kind suitable for transmitting control action to an electronic manual accelerator or to a braking system acting on potentiometers.

BACKGROUND OF THE INVENTION

In recent years, more precise and convenient devices have been developed to allow persons with disabilities to drive a vehicle.

Such control devices allow the operation of the controls by the simple operations, while maintaining maximum safety.

As to the controls to be operated directly acting on the steering wheel of the vehicle, with particular reference to the accelerator and to the brake, different solutions have been proposed, particularly by the same Applicant, concerning the use of mechanical or electromechanical devices that over the years have allowed many persons with disabilities to drive.

However, with the development of the technology, and particularly with the development of the electronic, new horizons opened in this specific field.

In fact, using electronic devices it is possible to make driving by persons with disabilities easier and safer, giving performances far better then those obtained until now.

Obviously, the development of electronic acceleration, braking and friction devices requires the realization of control transmission members different with respect to those presently used for the mechanical and electromechanical devices.

In this context, the Applicant has realized and established a modified steering wheel allowing transmission from the manual controls by the user to the electronic actuators for the accelerator or for another control member of the vehicle.

SUMMARY OF THE INVENTION

The solution suggested according to the present invention further has the object of allowing the transmission of the controls with the maximum safety in any situation.

A further object of the present invention is that of allowing the transmission of the control either in case the driver is driving straight, around a curve, or engaging in another maneuver.

These and other objects are obtained according to the present invention, by a solution providing a steering wheel substantially divided in two halves along a horizontal plane, and a series of elastic means provided between said two halves maintaining the same halves spaced apart in a rest position, when not stressed, and that allow the approaching of the two halves under the action of the driver on a point along the circumference of the steering wheel, so as to act on one or more potentiometers transmitting the control to the electronic member, bringing back the two halves to the rest position when the action is interrupted.

It is therefore specific object of the present invention is to provide a manual control device for acceleration, braking, etc., particularly from the vehicle steering wheel, comprising a circular bearing element upon which a plurality of lever elements is provided, said lever elements being swingable in order to swing on said bearing element together between a rest position and control transmission positions by the manual action of the driver, and to elastically return to the rest position once the manual action is finished; at least one of said lever element acting, when in one of the operative positions, on a potentiometer element.

According to a first embodiment of the device according to the invention, said lever elements are fixedly mounted on a cable having elastic features when torsionally stressed, said cable being provided within a seat realized above said circular support.

In a further embodiment of the device according to the invention, said lever elements are singularly swingable mounted on said bearing element, each one with a pivoting point, and are made integral by a restraining sliding means located along their lateral surfaces.

Particularly, said pivoting point for each lever element is made up by a support bracket on the bearing element, having a transverse hole and of a couple of brackets astride of the bearing element bracket and having a corresponding transverse hole for the insertion of a pin.

Still according to the invention, said lever elements can be provided on the bearing element so as to swing inwardly or outwardly.

According to another embodiment of the device according to the invention, said lever elements can be provided in such a way to elastically swing both inwardly and outwardly, so that at least one of them can act on potentiometer means inwardly provided with respect to the bearing element, and at least one of them, even the same, can act on potentiometer means externally provided with respect to the bearing element.

BRIEF DESCRIPTION OF THE DRAWINGS

The present invention will be now described, for illustrative, but not limitative purposes, according to its preferred embodiments, with particular reference to the figures of the enclosed drawings, wherein.

DETAILED DESCRIPTION OF THE DRAWINGS

Figure 1:
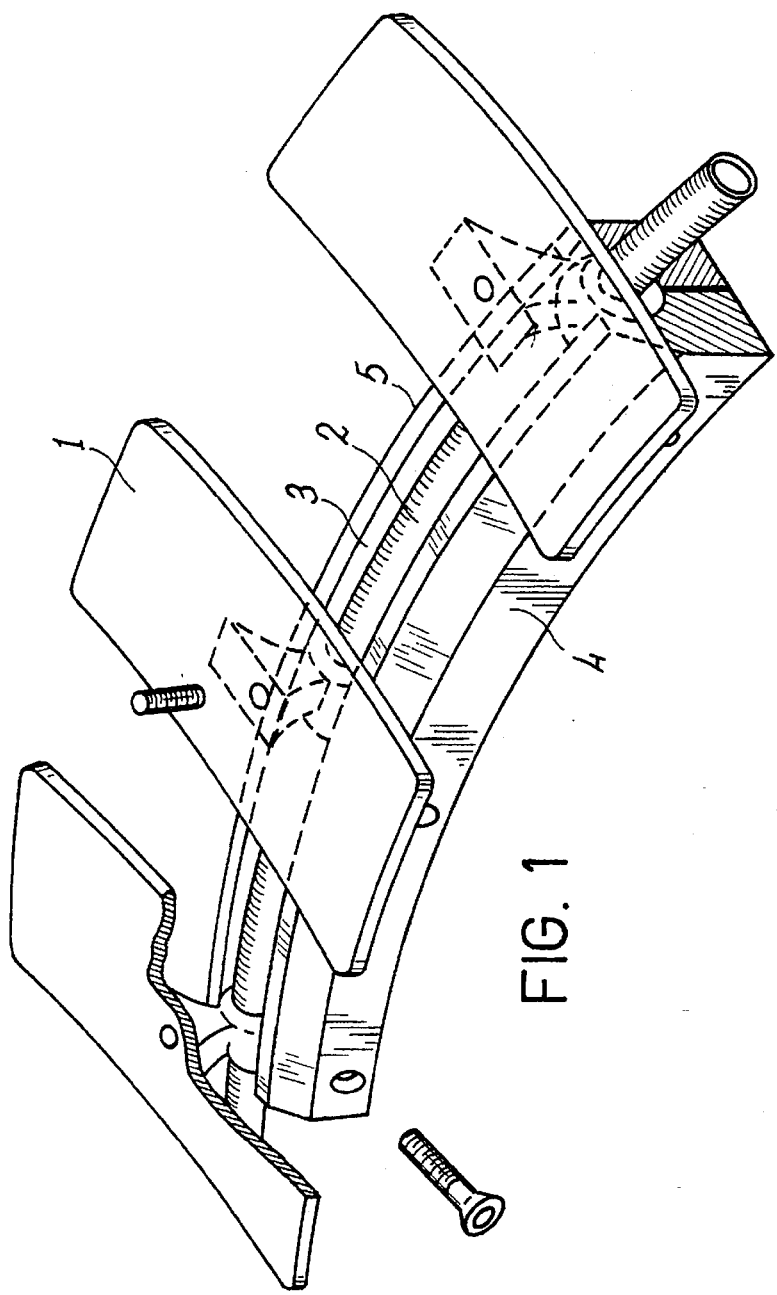
FIG. 1 shows a partial view of a first embodiment of the device according to the invention.
Figure 3:
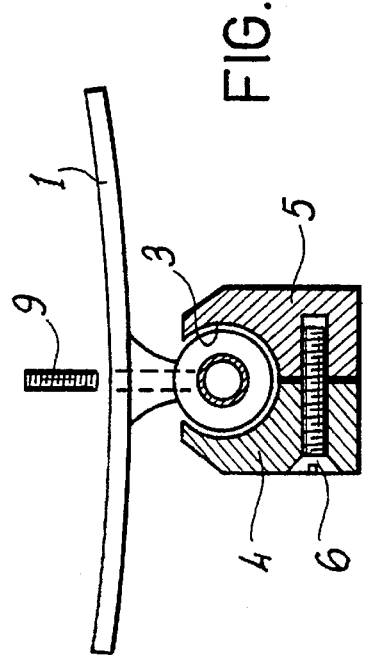
FIG. 3. shows a section view of the device according to FIG. 1.
Figure 2:
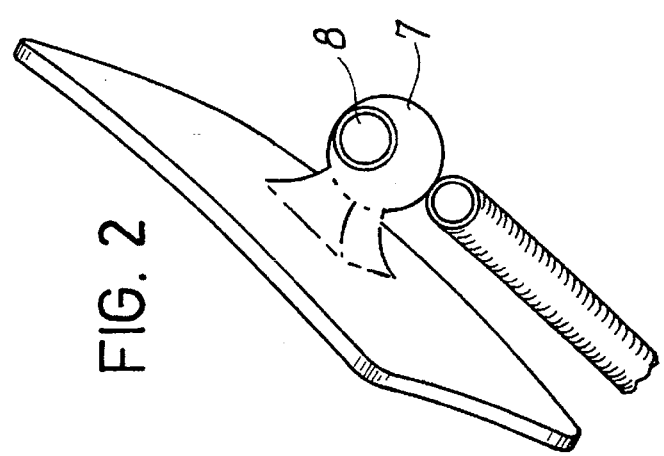
FIG. 2 shows a particular of the device of FIG. 1.

Referring first to FIGS. 1–3, it is shown a first embodiment of the device according to the invention.

Structurally, it provides a plurality of levers 1 provided along a circumference substantially corresponding to the circumference of the vehicle steering wheel (not shown).

Said levers 1, in the described solution, are integrally coupled with a cable 2, having elastic features when is torsionally stressed, and seated in a suitable seat 3 established by a circular bearing made up of two halves 4 and 5 coupled by a series of pins 6.

As it is well evident from FIGS. 2 and 3, the coupling between the levers 1 and the cable 2 occurs by spherical elements 7, fixed below each lever 1, having a through hole 8 through which the cable 2 passes.

The locking of the single levers 1 fixed along the cable 2 is realized by pins 9 locking from the above the levers 1.

Said spherical elements have such shape and dimensions to be able to rotate within the seat 3 established between the two halves 4 and 5.

When the described structure is completely assembled, a disposition of levers 1 is obtained swinging in the same way and together if a pressure is applied, and that come back to the rest position when the pressure is finished, due to the elastic return force of the cable 2.

In correspondence of one of the levers 1, below the same, it will be provided a potentiometer (not shown) that will be connected to the accelerator or other mechanism to be controlled.

In the illustrated embodiment, the levers 1 are mounted on the cable 2 in such a way to act on the potentiometer when they are pressed outwardly: in fact they project outwardly with respect to the same cable 2.

As already said, it is however important to point out that said levers 1 could also project inwardly, in this case acting on a potentiometer internally provided with respect to the bearing halves 4, 5.

This kind of solution is particularly interesting and advantageous in case it is provided the air bag, since, if during the acceleration an accident occurs causing the opening of the air bag, the latter would determine a sudden deceleration of the vehicle since it thrust again outwardly the levers 1 that was pressed inwardly.

It must further taken into consideration that this kind of solution, like the one that will be described in the following and other that could be realized on the basis of the technical solution according to the present invention, could be used to manually control two different devices.

In fact, if the levers 1 are swinging provided on the cable 2, or on other means, internally and externally projecting, two potentiometers connected to two different controls can be provided.

Figure 4:
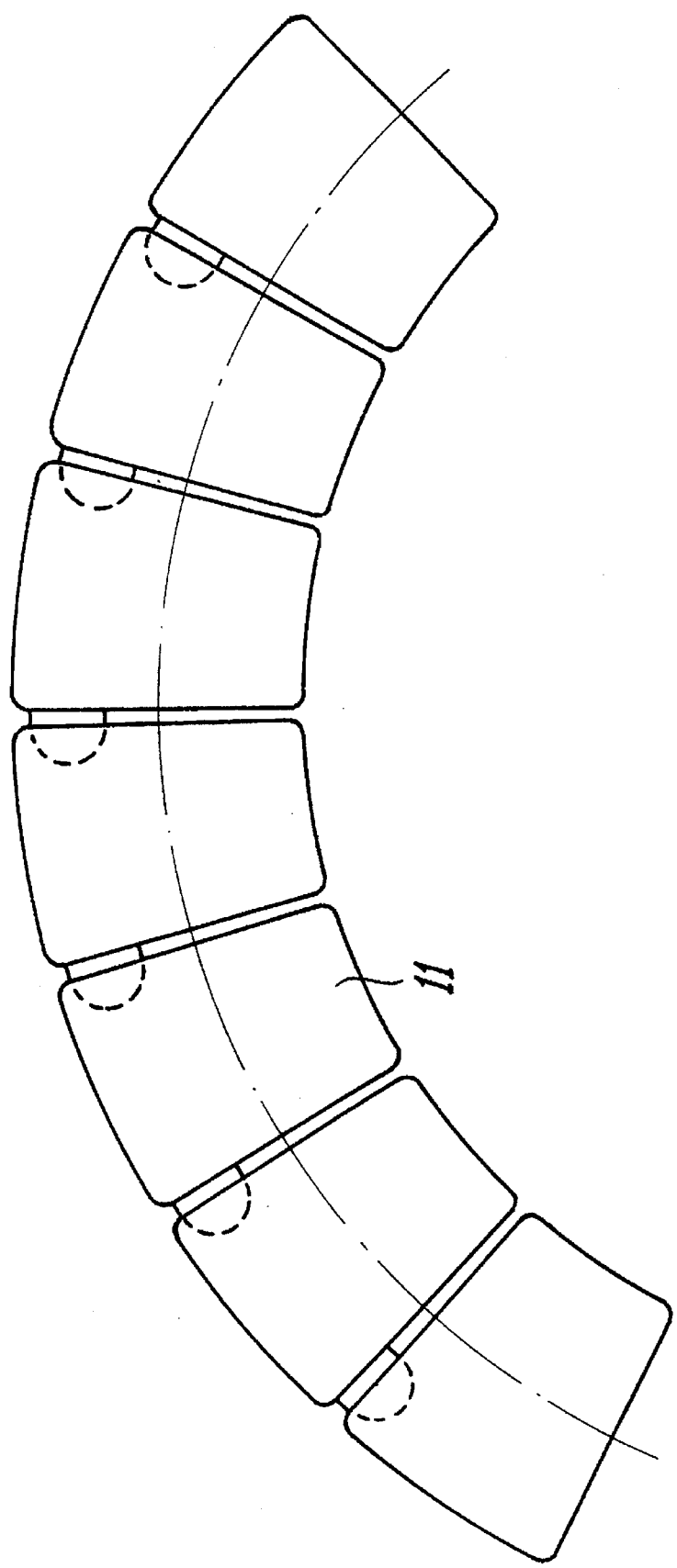
FIG. 4 is a partial view from above of a second embodiment of the device according to the invention.
Figures 5, 6:
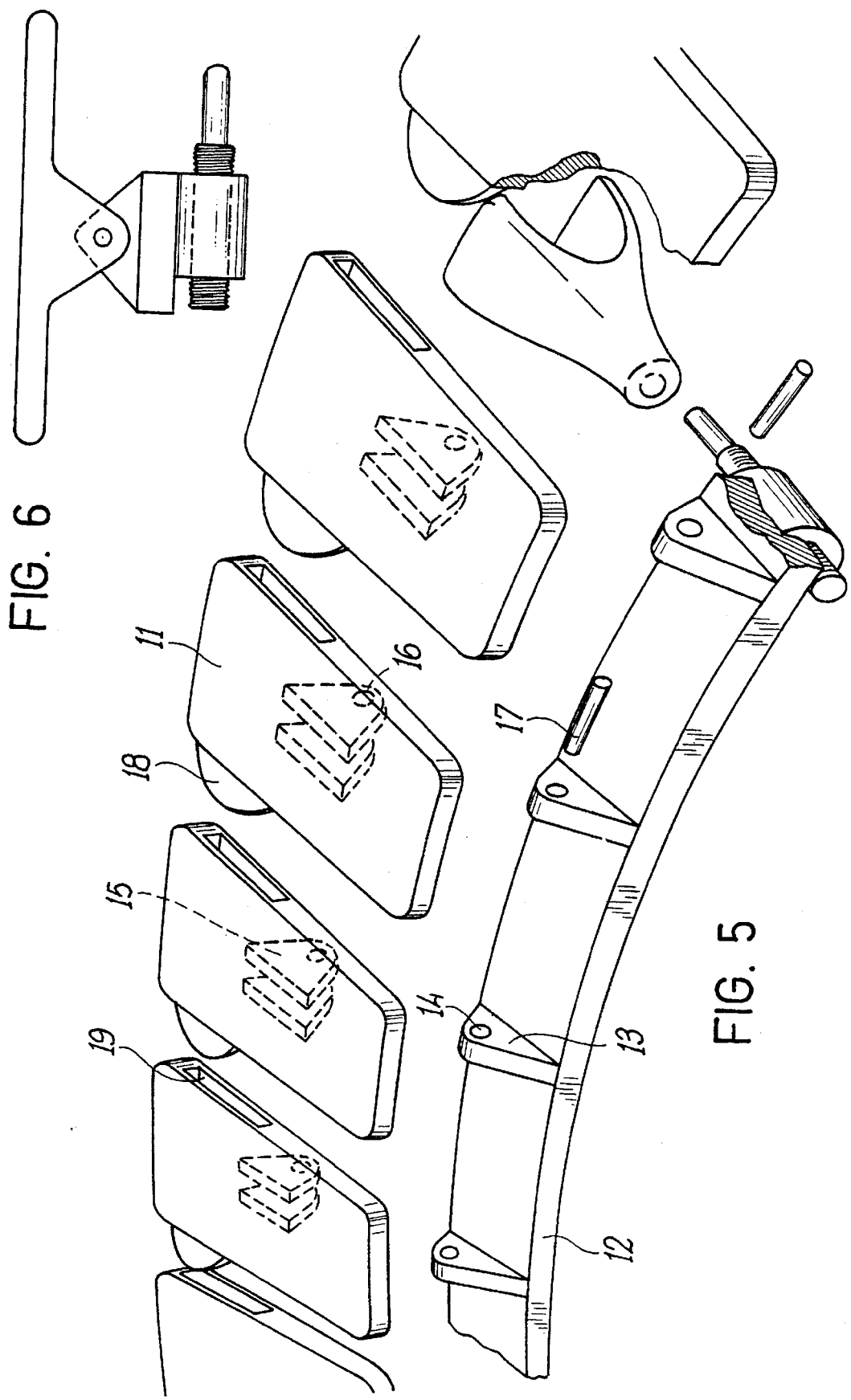
FIG. 5 is an exploded partial view of the device of FIG. 4.
FIG. 6 shows a lateral view of a particular of the device of FIG. 4.
Figure 8:
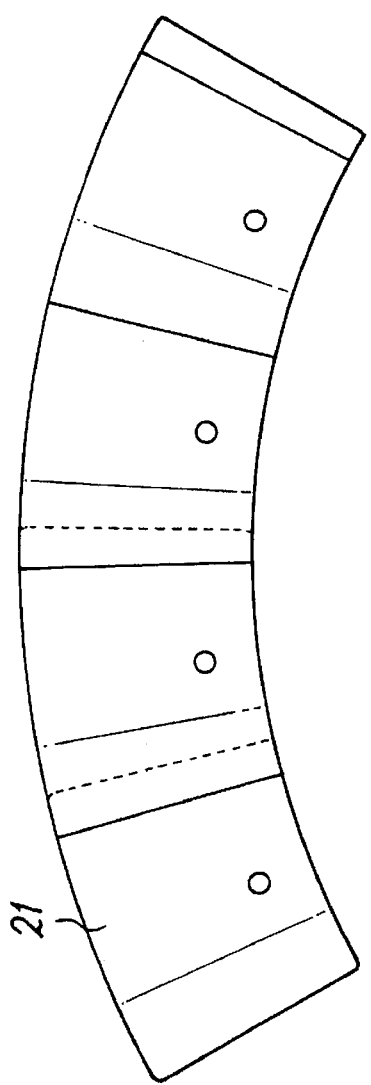
FIG. 8 is a plan view of the embodiment of the device according to the invention employing the element of FIG. 7.
Figure 7:
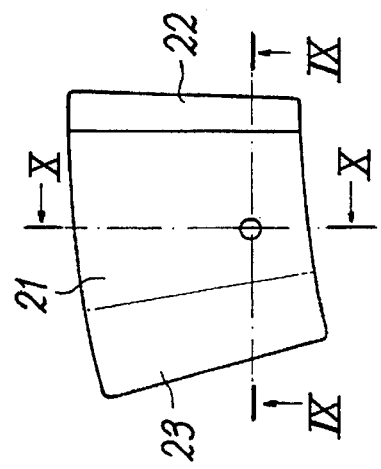
FIG. 7 is a plan view of a lever element of a further embodiment of the device according to the invention.
Figure 10:
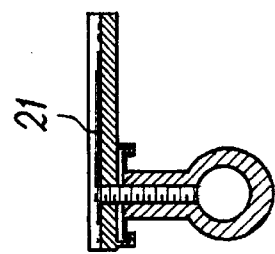
FIG. 10 is a section view along the line X—X of FIG. 10.
Figure 9:
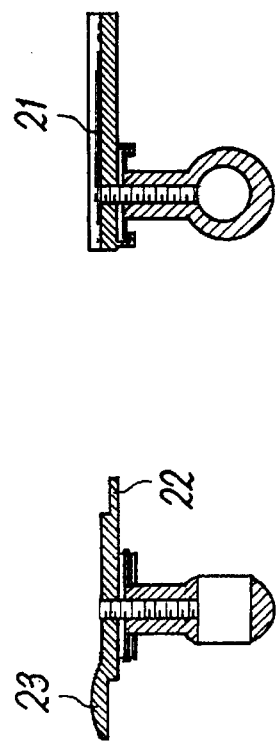
FIG. 9 is section view along the line IX—IX of FIG. 7.

Coming now to examine FIG. 4–6, it can be considered a second embodiment of the device according to the invention, the operating principle being the same of the preceding embodiment.

In the illustrated solution, the single levers 11 are integrally swinging mounted on a bearing 12 upon which brackets 13 with a through hole 14 are provided.

Each one of the levers 11 is provided with downwardly projecting brackets 15 placed astride of the corresponding bracket 13 on the bearing 12 and having a through hole 16.

The locking of the single lever 11 on the bearing 12 is realized by locking pins 17.

Each lever 11 is connected with the others, during their pivoting swinging motion about said pins 17, by lateral projections 18 projecting from one side of each lever. The lateral projection projects into corresponding recesses 19 provided on the other side of the adjacent lever 11 so as to leave a predetermined clearance but allowing the lever to be lifted and lowered.

Once assembled, the structure comprised by the levers 11, connected to each other as described, and by the bearing 12, a disposition is obtained having mechanical features very similar to those of the solution described with reference to the FIGS. 1–3. Thus, the structure is able to act in a similar way upon one or two potentiometers.

Coming now to the FIGS. 7–10, a further embodiment of the device according to the invention is illustrated. This embodiment is similar to the structure described with reference to the FIGS. 1–3, providing a plurality of lever elements 21 coupled to a cable (not shown), particularly a Bauden cable.

Laterally, each one of said elements 21 has a upper shaped portion 22 coupling with a lower shaped portion 23 on the confining side of the adjacent element 21.

In this way, all the lever elements 21 are operatively connected each other, so that it is sufficient to act upon one of them to operate the others.

However, generally speaking, it can be noted how the structure according to the present invention can act on only one potentiometer, or on only one potentiometer for each kind of control to be transmitted. The structure of the present invention allows the operator to place pressure on the steering wheel along any point of its circumference, but obtain the same kind of effect on the device to be controlled.

This result is obtained during a rectilinear motion as well as along a bend or during a maneuver.

Further, the structure of the device just described provides for immediate the interruption of the control when the action on the device is finished.

The present invention has been described for illustrative but not limitative purposes, according to its preferred embodiments, but it is to be understood that modifications and/or changes can be introduced by those skilled in the art without departing from the scope of the invention as defined by the enclosed claims.

I claim:

1. A manual control device for transmitting manual control operation from a vehicle steering wheel, comprising a plurality of lever elements, a circular bearing element on which said plurality of lever elements are fixedly mounted, a cable having elastic features when said cable is torsionally stressed, said cable being supported within a seat established by said circular bearing element, said lever elements being connected together and swingable relative to said circular bearing element between a rest position and manual operating control transmission positions that induces torsional stress on said cable where said levers elastically return to a torsionally unstressed rest position once the manual operation is complete and where at least one of said lever elements acts on a potentiometer element.

2. The device according to claim 1, characterized in that each of said lever elements are swingably mounted on said circular bearing element and each lever element is laterally superimposed on an adjacent lever element where pivoting of one lever causes pivoting of adjacent levers to torsionally stress the cable and to cause a control signal to be transmitted to an electronic member.

3. The device according to claim 2, characterized in that said bearing element has an upper surface, said upper surface defining a plane and said lever elements are provided in such a way to elastically swing both above and below the plane established by the circular bearing element, so that at least one lever element can act on said potentiometer element when in an operating position above the plane established by the circular bearing element and at least one lever element can act on said potentiometer element when in an operating position below the plane established by the circular bearing element.

4. The device according to claim 2, characterized in that said bearing element has an upper surface, said upper surface defining a plane and said lever elements are provided on the bearing element so as to swing below the plane defined by said upper surface.

5. The device according to claim 2 characterized in that said bearing element has an upper surface, said upper surface defining a plane and said lever elements are provided on the bearing element so as to swing above the plane defined by said upper surface.

6. The device according to claim 1, characterized in that said bearing element has an upper surface, said upper surface defining a plane and said lever elements are provided on the bearing element so as to swing below the plane defined by said upper surface.

7. The device according to claim 1, characterized in that said bearing element has an upper surface, said upper surface defining a plane and said lever elements are provided on the bearing element so as to swing above the plane defined by said upper surface.

8. The device according to claim 1, characterized in that said bearing element has an upper surface, said upper surface defining a plane and said lever elements are provided in such a way to elastically swing both above and below the plane established by the circular bearing element, so that at least one lever element can act on said potentiometer element when in an operating position above the plane established by the circular bearing element and at least one lever element can act on said potentiometer element when in an operating position below the plane established by the circular bearing element.

9. The device according to claim 1, characterized in that said lever elements are singularly swingably mounted on said bearing element, each lever having a pivoting point, and where said levers are made integral each other by restraining sliding means established complementary along their lateral surfaces.

10. The device according to claim 9, characterized in that said bearing element has an upper surface, said upper surface defining a plane and said lever elements are provided on the bearing element so as to swing below the plane defined by said upper surface.

11. The device according to claim 9, characterized in that said bearing element has an upper surface, said upper surface defining a plane and said lever elements are provided on the bearing element so as to swing above the plane defined by said upper surface.

12. The device according to claim 9, characterized in that said bearing element has an upper surface, said upper surface defining a plane and said lever elements are provided in such a way to elastically swing both above and below the plane established by the circular bearing element, so that at least one lever element can act on said potentiometer element when in an operating position above the plane established by the circular bearing element and at least one lever element can act on said potentiometer element when in an operating position below the plane established by the circular bearing element.

13. The device according to claim 9, characterized in that said pivoting point for each lever element is made up by a support bracket on the bearing element said support bracket having a transverse hole and of a pair of lever element brackets cooperating with said bearing element bracket and each lever element bracket having a corresponding transverse hole for for receiving an inserted pin.

14. The device according to claim 13, characterized in that said bearing element has an upper surface, said upper surface defining a plane and said lever elements are provided on the bearing element so as to swing above the plane defined by said upper surface.

15. The device according to claim 13, characterized in that said bearing element has an upper surface, said upper surface defining a plane and said lever elements are provided on the bearing element so as to swing below the plane defined by said upper surface.

\* \* \* \* \*